United States Patent [19]
Shulz

[11] 3,716,188
[45] Feb. 13, 1973

[54] STEAM GENERATOR CONTROL
[75] Inventor: Robert J. Shulz, Brookfield, Ill.
[73] Assignee: Vischer Products Company
[22] Filed: April 10, 1970
[21] Appl. No.: 31,450

Related U.S. Application Data
[62] Division of Ser. No. 765,351, Oct. 7, 1968, Pat. No. 3,571,563.

[52] U.S. Cl............236/92 R, 219/332, 236/26, 236/78 A, 337/300
[51] Int. Cl............G05d 16/02, G05d 27/00
[58] Field of Search.236/26, 26 A, 46 A, 78 A, 15 C, 236/15 B, 92, 21, 76, 1 E; 219/332, 496; 337/300, 310, 315, 308, 2, 312; 21/94; 13/31

[56] References Cited

UNITED STATES PATENTS

| | | | |
|---|---|---|---|
| 2,126,384 | 8/1938 | Haines | 236/76 X |
| 1,936,324 | 11/1933 | Carson, Jr. | 236/76 X |
| 2,804,525 | 8/1957 | Mantz | 200/140 |
| 3,352,987 | 11/1967 | Machado et al. | 337/310 |
| 1,975,851 | 10/1934 | Kimball | 236/92 X |
| 2,026,596 | 1/1936 | Ross | 219/496 X |
| 2,671,838 | 3/1954 | Senm | 337/317 |
| 2,596,704 | 5/1952 | Malutich | 337/317 |

Primary Examiner—William E. Wayner
Attorney—Lawrence B. Biebel, Nathaniel R. French, Dailey L. Bugg, Joseph G. Nauman, Gilbert N. Henderson, Mario A. Martella, Edward P. Forgrave and Thomas W. Flynn

[57] ABSTRACT

A steam chamber and heater for generating steam to fill said steam chamber in combination with a control system therefor. The control system automatically energizes the heater in response to a combined signal, incorporating both temperature and pressure measurements, when the combined signal is below a predetermined level and automatically deenergizes the heater when the combined signal exceeds said predetermined level. The control system also deenergizes the heater in response to signals indicating maximum individual predetermined levels of temperature or pressure, and thereby acts as a temperature and pressure override safety system. Deenergization of the heater by one of the override controls requires manual reenergization of the heater.

6 Claims, 2 Drawing Figures

STEAM GENERATOR CONTROL

CROSS REFERENCE TO RELATED APPLICATION

This is a division of application Ser. No. 765,351, filed Oct. 7, 1968, entitled "Autoclave" now U.S. Pat. No. 3,571,563, issued Mar. 23, 1971.

This invention relates to apparatus for accurately controlling the temperature and the pressure of the steam or other vapor within a chamber during it operation.

The present invention will be disclosed with reference to its use in steam autoclaves for sterilizing medical supplies such as instruments, dressings, and other items. However, it is not limited to such an application and may be used advantageously to control the temperature and pressure of the steam within chambers that are intended for other uses.

One type of autoclave that may be used for sterilizing includes a sterilizing chamber, a source of water, a heater, and a steam condenser. The items that are to be sterilized are placed within the sterilization chamber. A measured amount of water is then introduced into the chamber which is hermetically sealed. The water is heated to generate the steam which fills the chamber. At the conclusion of the sterilizing operation, the steam is evacuated from the sterilizing chamber. The chamber may then be opened and the sterilized items removed.

Some sterilizing autoclaves are provided with automatic controls for controlling their heaters. These controls turn off the heater when the sterilization temperature is reached or in the event of a malfunction of the autoclave that results in excessive temperatures. Also, apparatus has been provided to indicate visually or audibly the completion of the sterilization operation or a malfunction of the autoclave.

The indicators or heater controls have been operated in response to a temperature sensitive element mounted within the sterilization chamber. In some prior art devices, the heater is automatically turned off at a predetermined temperature and may be automatically turned on when the temperature falls below this predetermined temperature.

In these autoclaves a malfunction detector may provide a separate indication at a temperature higher than the sterilization temperature and may disconnect the heater at this temperature. Ordinarily the disconnected heater will remain off until manually reconnected.

Temperature control devices for autoclaves frequently include a time-interval counter rather than a temperature sensitive device. The time-interval counter is preset to the period of time that it normally takes to fill the sterilization chamber with steam and to raise the temperature to the proper level for sterilization. The time-interval counter is started when the heater is turned on, and turns the heater off after the expiration of its preset time interval. It may also activate an indicator after the sterilization operation has been completed.

The above-mentioned heater controls and indicators have some disadvantages that stem from their reliance on temperature alone or on the expiration of a period of time to determine when the heater should be turned off, the indicators activated or other measures taken. The amount of time required to reach the proper temperature will vary depending on such factors as the starting temperature of the water and the resistance of the heating element. These variations limit the accuracy of controls that rely only upon the time normally required to fill the sterilization chamber with steam.

Similarly, many temperature measuring devices utilize materials that have a high temperature coefficient of expansion and measure the temperature by monitoring the dimensions of these materials. However, the amount of change in the size of these materials is slight as the temperature changes. The accuracy of controls that rely on such changes in size is limited because of their low magnitude. Motion transmitting devices are sometimes coupled to these materials to provide an output motion proportional to the change in dimension of the temperature-sensitive material but greater in magnitude. These motion transmitting devices reduce the accuracy of the temperature measurement.

Moreover, the temperature sensitive element or the elapsed time counter may malfunction, causing the sterilization chamber to become overheated. Also the autoclave may contain an insufficient amount of water or no water at all at the start of the sterilization operation. Under these circumstances the sides of the sterilization chamber and the items in the chamber absorb an excessive amount of heat before the temperature sensitive device is activated. This happens because the temperature sensitive device is calibrated to operate in a chamber filled with steam under pressure. If there is no steam or an insufficient amount of steam, it absorbs heat slower than where the steam is present and in contact with the element itself. For this reason, the lack of sufficient water in the autoclave may result in serious overheating.

SUMMARY OF THE INVENTION

In accordance with the above and further objects, a control for an autoclave is provided, having a temperature-sensitive expansion unit, a pressure-sensitive expansion unit, a temperature control unit, and an over temperature-pressure control unit. These units cooperate to provide a controller that operates in accordance with the relationship between the temperature and pressure of steam in a closed system. At temperatures above 212° Fahrenheit, the vapor pressure of the steam in the closed system increases as the temperature increases. By measuring both the steam temperature and the steam pressure with they temperature-sensitive expansion unit and the pressure-sensitive expansion unit respectively, the controller derives an accurate signal at the sterilization temperature from the temperature control unit and also obtains two independent safety checks against over heating from the over temperature-pressure control unit.

The temperature control unit and the over temperature-pressure control unit each include a different pair of relatively movable sections, with one section of each pair being moved by the temperature-sensitive expansion unit, and the other section of each pair being moved by the pressure-sensitive expansion unit. The two sections of the temperature control unit are brought into contact with each other by the temperature-sensitive expansion unit and the pressure-sensitive expansion unit at a preset value of steam pressure and temperature within the steam chamber of the autoclave. The use of two independently movable sections increases the accuracy of measurement by increasing the amount of motion over that obtainable from a single section.

When these two sections are brought into contact, the heater of the autoclave is turned off so that the temperature in the steam chamber does not exceed its preset value. After the steam has cooled below this value, the heater is again turned on until the sterilization operation is complete. On the other hand, the two sections of the over temperature-pressure unit are brought into contact whenever either the temperature or the pressure, but not both, are indicated as being excessively high. When these two sections are brought into contact, the heater is also turned off, and cannot be turned on until a manual reset button is depressed. The two sections of the over temperature-pressure unit are brought together when the temperature is excessively high, even though there may be no steam or insufficient steam in the steam chamber of the autoclave. These two sections are also brought together when the steam pressure is excessively high, but the temperature sensitive expansion unit does not detect the high temperature.

In summary, the temperature control unit is activated only at a predetermined value of temperature and pressure to indicate that the preset temperature has been reached, while the over temperature-pressure switch is activated by either of two abnormal conditions: (1) the detection of a high temperature and low steam pressure; or (2) the detection of a low temperature and high steam pressure.

The invention and other attendant objects and advantages thereof will be better and more fully understood from the following detailed description when considered in connection with the accompanying drawings in which:

FIG. 1 is a longitudinal sectional view taken through the controller of this invention; and FIG. 2 is a diagrammatic view, partially in section showing the relationship of the control unit of this invention with the steam chamber of an autoclave.

DESCRIPTION OF THE PREFERRED EMBODIMENT

Figure 1:
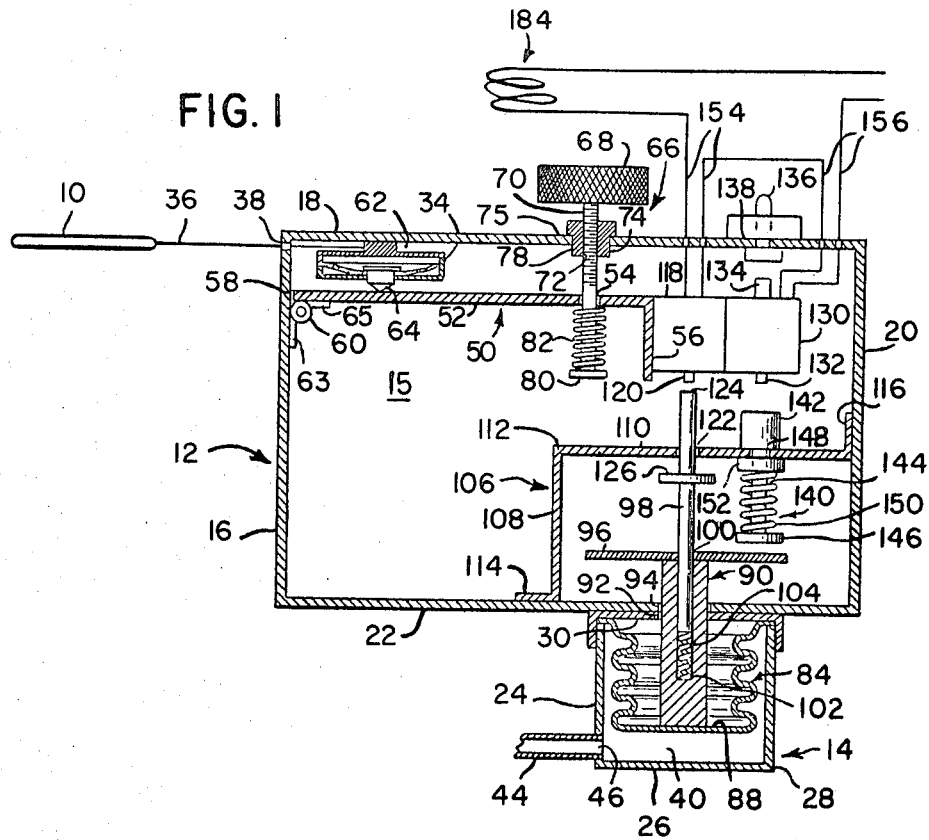

In FIG. 1, a longitudinal sectional view of a monitor in accordance with this invention is shown, having a temperature bulb 10, a hollow main housing 12, and a pressure bellows housing 14. The hollow interior of the main housing 12 is protected by six walls, four of which 16, 18, 20, and 22 are shown; the hollow interior of the pressure bellows housing 14 is also protected by six walls, four of which 24, 26, 28, and 30 are shown.

The temperature bulb 10 is mounted within the steam chamber 32 (FIG. 2) of an autoclave, and includes within its hollow interior a liquid that expands as its temperature expands. This liquid is able to flow into the hollow interior of a temperature bellows 34 through a hollow tube 36 that communicates with the interiors of the temperature bulb 10 and the temperature bellows 34. The temperature bellows 34 is within the main housing 12. To connect the bulb 10 to the bellows 34, the tube 36 passes through an aperture 38 in the wall 16 of the main housing 12.

The hollow interior 40 of the pressure housing 14 communicates with the interior 42 of the steam chamber (FIG. 2) through the hollow conduit 44 which has a port 46 opening into the space 40 and a port 48 (FIG. 2) communicating with the hollow interior 42 of the steam chamber 32.

In accordance with an important feature of this invention several operating elements are mounted within the chamber 15 of the main housing 12. These elements consist of a temperature-sensitive expansion unit, a pressure-sensitive expansion unit, a temperature control unit, and an over temperature-pressure control unit. The temperature control unit and the over temperature-pressure control unit each comprise a pair of sections, one section of each pair being mounted to a portion of the temperature-sensitive expansion unit and the other section of each pair being mounted to a portion of the pressure sensitive expansion unit. As the temperature increases, the temperature sensitive expansion unit moves one section of the temperature control unit and one section of the over temperature-pressure control unit towards the pressure-sensitive expansion unit; as the pressure increases, the pressure-sensitive expansion unit moves the other section of the temperature control unit and the other section of the over temperature-pressure control unit towards the temperature sensitive expansion unit.

The temperature-sensitive expansion unit includes a cantilever arm 50 having a first flat section 52, and a second flat section 56, orthogonal to the section 52. The first flat section 52 includes an aperture 54. One end 58 of the flat section 52 is positioned in proximity with the inner side of the wall 16. A hinge 60 has one side 63 welded to the inner side of the wall 16 and the other side 65 welded to one side of the flat section 52 adjacent to the end 58 to mount the cantilever arm 50 to the wall 16. With this mounting, the cantilever arm 50 forms a resilient support which may move with respect to the wall 16 so that the end 56 is either closer to the pressure sensitive expansion unit or further away from the pressure sensitive expansion unit.

The flat section 52 of the cantilever arm 50 is supported by the temperature calibration unit 66. This unit includes a knurled control knob 68, which is positioned above the wall 18, and mounted to the top end of the threaded shaft 70. The threaded shaft 70 threadably engages the tapped central aperture 72 of a bushing 74, which bushing has a shoulder 76 abutting the top of the wall 18 and a lateral surface 78 parallel to the threaded central aperture 72 and abutting the sides of the circular aperture through the wall 18. The bottom side of the shaft 70 passes through the aperture 54 and terminates in a shoulder 80. A helical spring 82 circumscribes the shaft 70 between the shoulder 80 and the bottom side of the flat portion 52 of the cantilever arm 50.

The temperature-sensitive expansion unit is calibrated by means of the temperature calibration unit 66. As the knob 68 is turned counter-clockwise, the shoulder 80 moves closer to the bottom side of the flat portion 52 of the cantilever 50. This increases the compressive tension of the helical spring 82 between the shoulder 80 and the flat portion 52 of the cantilever 50. In this manner the cantilever 50 is supported and biased away from the pressure sensitive expansion unit by turning the knurled control know 68 in a clockwise direction. The top surface of the wall 18 is calibrated to correspond to an arrow marked on the knurled knob 68 to indicate positions of the knurled knob 68 with respect to temperatures within the interior 42 (FIG. 2) of the steam chamber 32. The setting of the knob 68 determines the temperature at which the heater 184 (FIG. 2) of the steam chamber 32 is to be turned off to terminate a sterilization operation or to maintain the temperature below a preset limit for a period of time that is controlled by an external timer.

The liquid filled bellows 34 is also part of the temperature sensitive expansion unit. It is mounted to the wall 18 between the wall 18 and the flat portion 52 of the cantilever arm 50 with its base 62 rigidly connected to the wall 18 and its moveable driving surface 64 in contact with one side of the flat portion 52 of the cantilever 50. In this position, the bellows 34 pushes the cantilever 50 towards the pressure sensitive expansion unit as the temperature within the interior 42 (FIG. 2) of the steam chamber increases.

The pressure housing 14 forms part of the pressure sensitive expansion unit. It is mounted outside of the wall 22, with the wall 30 placed in contact with the wall 22. The interior 40 of the pressure housing 14 communicates with the interior of the steam chamber 42, and includes a pressure bellows 84, having its opened end spaced against the wall 30 and its side wall held by the four walls orthogonal to the wall 30, which include the two walls 24 and 28.

Figure 2:
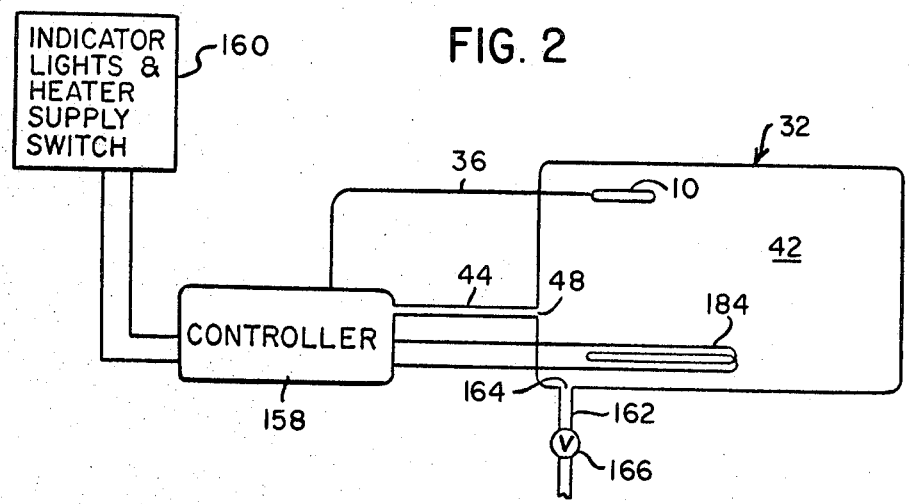

The bellows 84 is compressed in response to increases in pressure in the interior 42 of the steam chamber 32 (FIG. 2). The flat top portion 88 of the pressure bellows 84 is rigidly connected to a cylindrical housing 90, which housing passes through two aligned apertures 92 and 94 in the walls 30 and 22, respectively. The other end of the cylindrical housing 90 is rigidly attached to and supports the flat cylindrical drive plate 96. This drive plate is mounted orthogonally to the longitudinal axis of the cylindrical housing 90 and parallel to the wall 22 to move toward the temperature-sensitive expansion unit within the interior 15 of the housing 12 as the pressure in the steam chamber 32 increases and to move away from the temperature sensitive expansion unit as the pressure inside the steam chamber 32 decreases. A cylindrical bar 98 is inserted longitudinally through a central circular aperture 100 and through the drive plate 96 to fit inside the cylindrical aperture 102 along the longitudinal axes of the cylindrical housing 90 in communication with the interior 15 of the main housing 12. A helical compression spring 104 resiliently biases the bar 98 against the bottom of the cylindrical aperture 102 within the housing 90.

A rectilinear compartment is formed within the interior 15 of the main housing 12 by the bent metal plate 106, which plate has a first flat portion 108 perpendicular to the wall 22 and passing from one side to the other of the main housing 12 across the full width of the side 22 and a second flat portion 110 perpendicular to the side 20 and passing from one side to the other across the full width of the side 20. The flat portions 108 and 110 of the bent plate 106 meet at a corner 112. Their opposite edges terminate in the flat portions 114 and 116, respectively. The flat portion 114 may be welded or bolted to the wall 22 and the flat portion 116 to the wall 20 of the main housing 12.

The temperature control switch of the monitor includes a first section comprising a first electrical pushbutton switch 118, which may be of the Microswitch type, having a pushbutton 120, and being mounted against the flat part 56 of the cantilever arm 50 to be moved towards the pressure sensitive expansion unit as the temperature within the steam chamber 32 increases. The other section of the temperature control unit includes a spring-loaded plunger comprising the bar 98, the spring 104, and the cylindrical housing 90. The bar 98 protrudes through an aperture 122 in the flat plate 110, and has one end 124 aligned with the pushbutton 120 of the pushbutton switch 118. A radial shoulder 126 is mounted around the peripheral surface of the bar 98 underneath the plate 110 to contact the plate 110 and to restrain the bar 98 against the spring 104 as the pressure within the steam chamber 32 increases beyond that corresponding to the temperature necessary for sterilization. The shoulder 126 is located so that it approaches the plate 110 when the pressure within the interior 42 of the steam chamber has a value corresponding to the temperature necessary for a sterilization operation and the steam chamber 32 has a sufficient amount of water available to create steam.

The pivot arm 50, carrying the switch 118 thereon, and acted upon by the temperature sensor devices which include bulb 10 and bellows 34, together with the rod 98 which is acted upon by the pressure sensor including bellows 84 and the pressure pipe 44, functions as a differential actuating means for the switch 118. Increase in temperature produces a clockwise motion of arm 52 bringing the push button 120 of the switch closer to the tip 124 of the rod 98, while contraction of bellows 84 due to increased pressure causes the rod 98 to rise and decrease the distance which the switch must move to be actuated by the rod. Thus, the response of this portion of switch 118 to turn the power on and off to the heater, depending upon the combination of temperature and pressure conditions within the chamber.

The over temperature-pressure unit also includes two sections. The first section comprises a pushbutton switch 130, which is mounted to the pushbutton switch 118 to move therewith. The pushbutton switch 130 has an actuating pushbutton 132 and a reset button 134. An external manually-operated reset button 136 is mounted in an aperture 138. When the cantilever arm 50 is positioned at its room temperature related position, the manual button 136 is adjacent to the reset button 134 of the pushbutton switch 130. The cantilever arm 50 is in this normal position when the temperature in the steam chamber 32 is near room temperature. At this time the pushbutton 130 may be reset by depressing the button 136.

The other section of the over temperature-pressure switch includes a safety plunger 140. The safety plunger 140 includes a cylindrical head portion 142, a narrow elongated stem portion 144, and an end portion 146. The stem portion 144 passes through an aperture 148 and connects the cylindrical head 142, which is above the plate 110, to the end portion 146, which is below the plate 110. A helical spring 150 circumscribes the stem 144 between the end portion 146 and the washer 152 which is held against the bottom of the plate 110. The spring 150 biases the safety plunger down. The end 146 is aligned with the portion of the drive plate 96, and the head portion 142 is aligned with the plunger 132 of the pushbutton switch 130. As the pressure increases beyond the point where the spring-loaded plunger 98 is restrained by the shoulder 126, drive plate 96 contacts the end 146 of the safety plunger 144 and moves the safety plunger toward the button 132 of the pushbutton switch 130. Consequently, when the temperature within the steam chamber 32 is so low that the cantilever arm 50 is spaced away from the pressure sensitive expansion unit but the pressure in the steam chamber is high, the safety plunger 140 moves beyond the bar 98 and contacts the plunger 132 of the pushbutton switch 130.

The leads 154 of the normally closed pushbutton switch 118 and the leads 156 of the normally closed pushbutton switch 130 are each connected in series with the heater and the power supply for the heater 184. Accordingly, the heater is disconnected whenever the plungers 120 and 132 are depressed. Once the plunger 132 has been depressed, the heater is disconnected until the pushbutton switch 130 is reset by depressing the button 136. This cannot be done until the cantilever arm 50 has returned to its normal position, indicating that the interior 42 of the steam chamber 32 is near room temperature.

In FIG. 2, a diagrammatic sketch of a steam chamber 32 of an autoclave is shown, illustrating the manner in which it is inter-connected with a controller unit 158 in accordance with this invention to control the indicator lights and the heater supply switch 160 for the autoclave. In operation, water is introduced into the interior 42 of the steam chamber 32 through the hollow conduit 162, having the entrance port 164 into the chamber 42, and being selectively closable by the check valve 166 within the conduit 162. After water has been inserted into the chamber 42, the heater is turned on. The water is then boiled, filling the chamber 42 with steam. As the water boils, the steam pressure within the chamber 42 increases, causing the temperature to also rise.

The liquid-filled bulb 10 senses the increase in temperature and signals the controller 158; the controller 158 senses the increase in steam pressure through the conduit 44. If the autoclave is operating properly, the lever 50 moves the pushbutton switch 118 downward and the pressure bellows 84 moves the bar 98 upward until the end of the bar 124 depresses the button 120 of the pushbutton switch 118. The button 120 is depressed at the proper temperature for sterilizing the items within the chamber 42. The pushbutton switch 118 is normally closed and opens when the plunger 120 is depressed, disconnecting the power to the heater within the unit 160 and activating a normally open relay to connect power to an indicator light. This holds the temperature below the preset value. After the sterilization process is complete, the steam chamber 32 is evacuated of steam and the sterilized items within are removed. This is done after the heater has been manually disconnected by a master switch (not shown) and the steam chamber has cooled.

If no water enters the chamber 42 at the beginning of a cycle, the autoclave does not operate properly. This may happen because the operator neglects to fill the reservoir (not shown) with water, or because of a malfunction of the check valve 166 or for many other reasons. Since there is no water in the chamber, the items are not properly sterilized. Also it is possible that the heater will raise the interior 42 of the steam chamber 32 to too great a temperature and cause damage either to the items within to be sterilized or to the steam chamber 32 itself. This may happen because the temperature sensitive bulb 10 does not receive as much heat from radiation within the empty chamber as it would receive from direct conduction had there been steam in the chamber. Since the monitor is calibrated with the expectation that there will be steam in the chamber, a control based entirely on temperature as sensed by the bulb 10 would permit the chamber 42 to become too hot.

The controller 158 of this invention prevents this type of malfunction from damaging the chamber 42 or the items within the chamber 42. As the temperature increases, the cantilever arm 50 is moved down. When there is no steam in the chamber, the plunger 98 does not move up to contact the plunger 120 of the pushbutton switch 118. However, the button 132 of the pushbutton switch 130 contacts the head 142 of the safety plunger 140. This happens at a temperature higher than that necessary for sterilization, but a temperature which is low enough so that there is no danger of damage to the items within the sterilization chamber 142.

When the button 132 contacts the head 142 of the safety plunger 140, it opens the circuit to the heater. The circuit remains open until the cantilever arm 50 moves back to its normal position and the reset button 136 is depressed. Consequently, the heater is inactivated until the chamber 42 cools down and an operator manually resets the monitor. When the normally closed pushbutton switch 130 opens, a normally open relay is activated to connect power to a malfunction indicating light. This light is within the unit 160.

If the temperature sensing system should become faulty in a system controlled only by temperature, there would be danger that the steam pressure would build up to a dangerous level. The heater could remain on until it was damaged by the steam. The high temperatures thus generated could damage the items within the sterilization chamber, and perhaps the chamber itself.

The controller 158 of this invention prevents this type of damage from occurring. If the temperature sensing element should malfunction, the cantilever arm 50 would remain in place. Consequently, the end 124 of the plunger 98 would not depress the button 120 of the pushbutton switch 118 at the proper temperature. However, the drive plate 96 would contact the end 146 of the safety plunger 140 and move it upward. As the pressure increased beyond the preset level, the head 142 of the safety plunger 140 would contact the button 132 of the pushbutton switch 130. This again would disconnect the heater 184 and turn on the malfunction indicator light.

It can be seen that the temperature and pressure controller of this invention controls the temperature of the steam chamber of an autoclave in accordance with a relationship between both the temperature and the pressure. It can be easily preset to a desired temperature by merely changing the calibration for the temperature responsive part of the controller. On the other hand, it is able to disconnect the heater and provide an indication in the event of a malfunction which affects either only the temperature sensing portion of the autoclave or the pressure sensing portion of the monitor. Yet the monitor is reliable and inexpensive because of its simplicity.

While the invention has been described with a certain degree of particularity, many modifications and variations may be made in the light of the above teachings. It is therefore to be understood that, within the scope of the appended claims, the invention may be practiced otherwise than is specifically described.

What is claimed is:

1. A controller unit comprising: first means for sensing temperature; a movable support arm, said first means including a second means for moving said movable support to a first position at a low reference temperature, to a second position at a predetermined second higher temperature, and to a third position at a predetermined third higher temperature; first pushbutton switch means for providing a first signal when positioned in said second position, said first switch means being mounted to said movable support arm; second pushbutton means for providing a second signal when moved to said third position; said second switch means being mounted to said movable support arm; a pressure-sensing element adapted to be mounted in a location to be monitored; third means adapted to move toward said first and second pushbutton switches in response to increases in pressure sensed by said pressure-sensing means; a first plunger resiliently mounted to said third means and aligned with the activating plunger of said first pushbutton switch; said first plunger including a restraining means for preventing said plunger from moving beyond the predetermined distance, whereby said first pushbutton switch is activated by a predetermined sensed temperature and a predetermined sensed pressure; a second plunger mounted in a line with the activating plunger of said second pushbutton switch; said third means being adapted to contact said second plunger and move it into contact with said activating plunger of said second pushbutton switch while said first plunger is restrained by said restraining means and said support means is in said first position, whereby the high value of pressure will activate the second pushbutton switch while said temperature sensing means senses a low temperature; said first and second pushbutton switches being adapted to provide first and second signals for monitoring purposes.

2. A controller for a steam chamber or the like comprising a first switch operative to provide a control signal in response to predetermined combinations of temperature and pressure conditions, a temperature sensor; a pressure sensor, differential actuating means for said first switch including oppositely acting members one of which is responsive to said temperature sensor and the other of which is responsive to said pressure sensor to cause movement of said actuating means one as a result of increasing pressure and the other as a result of increasing temperature, and a second switch also controlled by said actuating means and operative to provide a continuing signal once the action of either of said temperature sensor and said pressure sensor reaches a predetermined limit.

3. A controller as defined in claim 1, including means for resetting said second switch only after said temperature sensor and/or said pressure sensor recedes to a condition below the predetermined limit.

4. A controller for the combined temperature and pressure of a chamber, said controller comprising
   a pivotally mounted arm,
   a temperature responsive device operating to rotate said arm in one direction,
   a first switch carried by said arm and having an actuator button for opening and closing said first switch,
   a control rod mounted for movement toward and away from said button to operate the switch, and
   a pressure responsive device connected to move said rod whereby actuation of said switch is controlled by the combination of temperature and pressure conditions.

5. A controller as defined in claim 4, including adjustable means connected to rotate said arm in the other direction for adjusting the temperature response of said first switch.

6. A controller as defined in claim 4 including a second switch also mounted on said arm,
   said second switch having an actuating button which functions to change the state of said second switch until it is reset and a reset button for reversing the state of said second switch once it is changed,
   a pressure limit actuator separate from said control rod and responsive to said pressure responsive device when said device moves beyond a predetermined limit,
   said limit actuator being aligned to operate said button of said second switch,
   and a manually operated reset actuator aligned with said reset button and so located with respect to said arm that said second switch can be reset only within predetermined limits of pressure and temperature.

* * * * *